Sept. 13, 1966   F. PAULIK ETAL   3,271,996
APPARATUS FOR THERMAL ANALYSIS
Original Filed Aug. 5, 1963   3 Sheets-Sheet 1

FERENC PAULIK,
JENÖ PAULIK, AND
LÁSZLÓ ERDEY
INVENTORS

BY Irvin S. Thompson
ATTORNEY

United States Patent Office 3,271,996
Patented Sept. 13, 1966

3,271,996
APPARATUS FOR THERMAL ANALYSIS
Ferenc Paulik, 7 Liptak Lajos utca, and Jenö Paulik, 57a Vecsey utca, both of Budapest IV, Hungary, and Laszló Erdey, 11 Fenyo utca, Budapest I, Hungary
Continuation of application Ser. No. 299,764, Aug. 5, 1963. This application Nov. 24, 1965, Ser. No. 513,649
1 Claim. (Cl. 73—15)

This application is a continuation of our copending application Ser. No. 299,764, filed Aug. 5, 1963, now abandoned.

The present invention relates to thermal test and analysis apparatus for simultaneously measuring and recording the following thermal properties of a single test specimen when subjected to heat: the temperature (for thermal analysis, or TA), the weight (for thermogravimetric analysis, or TGA), the thermal expansion (for thermodilatometric analysis, or TDA), and the rates of change of weight and thermal expansion; and the differential temperature between the test specimen and a reference specimen which is inserted through the tested temperature range (for differential thermal analysis, or DTA).

The chemical and physical alterations that take place in solid compounds under the effect of heat involve changes in the volume, the heat content and in some cases the weight of the test piece prepared from the compound to be tested. Various methods and apparatus are known permitting the measurement and automatic recording of either the change in heat content or dilatation or the change in thermal weight as a function of time and temperature. An earlier invention of the present inventors, a derivation apparatus by which, in addition to the simultaneous thermogravimetric analysis and differential thermal analysis, the rate of change in weight can also be determined, is already known, as in U.S. Patent No. 3,045,472.

It is the object of the present invention to provide an apparatus which in addition to the above parameters permits the measurement of the rate of dilatation and, in addition, performs all these measurements simultaneously and on a single test piece. Accordingly, the invention makes it possible to obtain further conclusions regarding the changes in crystal structure which take place in the test piece, the evaluation of which may be highly useful from analytical or other aspects. In its simplest form the apparatus performs the measurement of dilatation and its rate. An improved form of the apparatus comprises the determination of temperature and of the change in heat content, whereas the most highly developed embodiment of the apparatus according to the invention permits the testing of change in thermal weight and its rate, in addition to the foregoing parameters.

A common feature of all the embodiments according to the invention resides in that a test piece compressed from a sample of the compound to be tested is in connection through a transmission member, with an apparatus for forming the first differential quotient of dilatation.

The invention will be more particularly described with reference to the attached drawing, showing several embodiments of the apparatus according to the invention by way of example.

Figure 3:
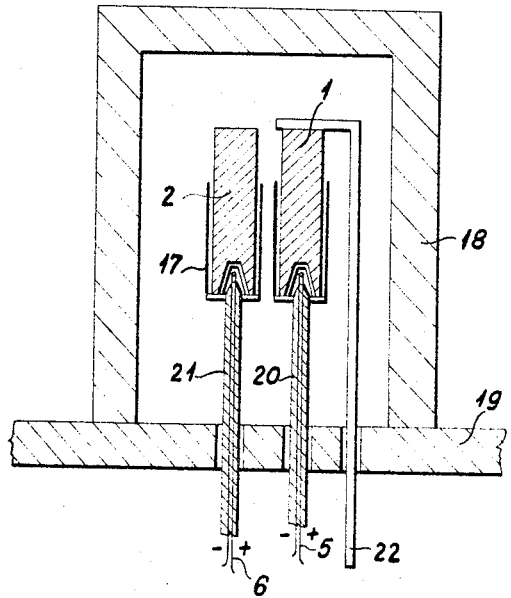

In FIGURE 3, a cylindrical test piece compressed from a sample of the material to be tested, a control test piece made of an inert material, and their ambages are represented on a larger scale.

Figure 2:
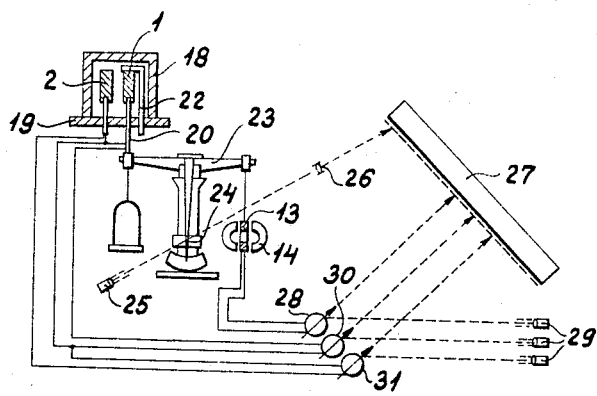
FIGURE 2 illustrates the same apparatus when combined with a derivatograph, to be used for analyses requiring the differential thermal analysis.
Figure 4:
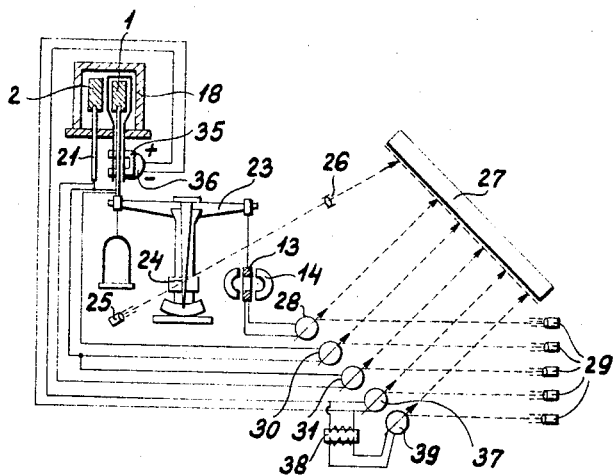

FIGURE 4 shows, in an arrangement similar to that shown in FIG. 2, an apparatus which is capable of measuring the change in weight and its rate of change, in addition to the above said parameters.

Figure 5:
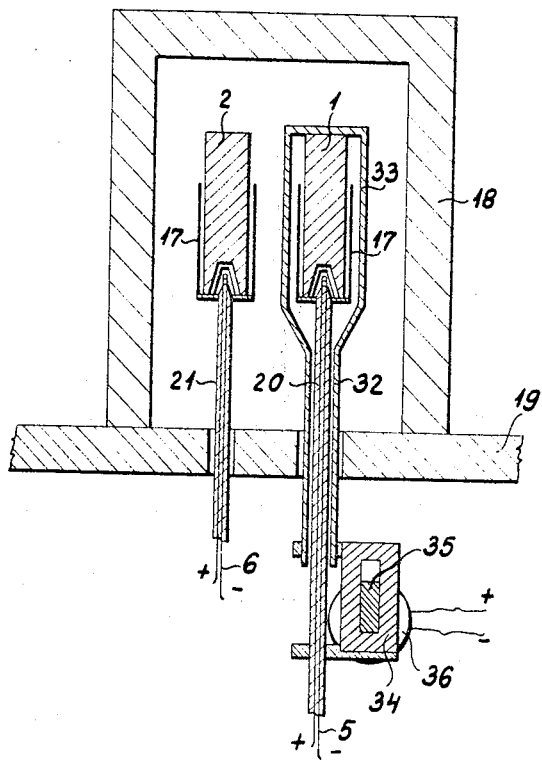

FIGURE 5 shows a detail of FIG. 4, represented in a manner similar to that of FIG. 3.

Figure 1:
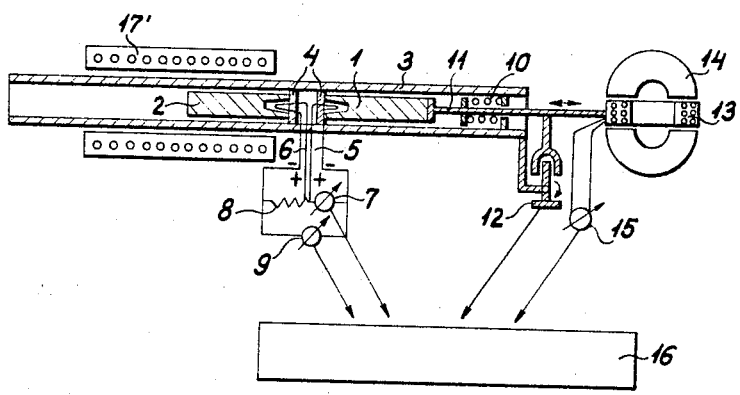
FIGURE 1 shows an apparatus for measuring dilatation and its derivative.

In the most simple arrangement according to FIG. 1, the cylindrical test piece 1 compressed from a sample of the compound to be tested, and a control test piece 2 of identical shape and size but made of an inert material, such as aluminum oxide, are placed in a tube 3 consisting of a material having a negligible heat expansion, for example quartz, in such a manner that the test piece should continually engage one of the partition walls 4 in the tube 3. In the opposed extremities of the test pieces 1 and 2, conical bores are arranged, housing the junctions of thermocouples 5 and 6 extending over the partition walls 4. The two thermocouples are connected in opposition and two reflecting galvanometers are connected into their circuit. Of these, the galvanometer 7 determines the temperature of the test piece 1, and the galvanometer 9 measures the difference of temperature between the test pieces 1 and 2. An ohmic resistance 8 serves to compensate the internal resistance of the galvanometer 7. Corresponding apparatus is disclosed in the above-identified patent and need not be disclosed in greater detail.

A rod 11 of equally negligible heat expansion, which acts as a transmission element, is pressed against the test piece 1 by a spring 10. A rotating mirror 12 is actuated by rod 11 with the aid of a suitable transmission. The rod 11 is in direct or indirect connection with a coil 13 which can move in a homogenous magnetic field between two magnets 14. The current thus induced in the coil 13 actuates a reflecting galvanometer 15. The mirrors of the galvanometers 7, 9, 15 as well as the mirror 12 reflect the light of the light sources (not shown) onto a rotary drum 16 covered by light-sensitive paper, the drum being driven by a motor or a clockwork. The temperature of the test pieces 1 and 2 may be increased with the aid of an electric oven 17' which is slidably arranged on tube 3.

In FIG. 2, an embodiment of the derivatograph modified in accordance with the invention is shown. The original object of the derivatograph is to measure simultaneously the change in thermal weight, the rate of change in weight, the change in heat content, and the temperature of a sample in powder form. The test pieces 1 and 2 are placed in the crucibles 17 (FIG. 3) in a manner that they should not engage the walls of the crucible but should merely rest on their bottoms. The thermocouples 5 and 6 pass through the openings in the bottom 19 of the oven 18, and are enclosed in quartz tubes 20 and 21, respectively. A stop 22 extending over the test piece 1 ensures that under the effect of heat the test piece can only expand downwardly. The tube 20 loads one end of the beam 23 of the thermobalance of the derivatograph (FIG. 2). The balance is loaded with a counterweight heavier than the probable change of weight of the test piece. Under the effect of overweight, the upper end of the test piece 1 engages the stop 22, the lower end of which is fixed to the stationary part of the thermobalance of the derivatograph. When the test piece 1 expands at the prescribed temperature, the balance swings out. The pointer 24 of the balance has a slot through which the light of a lamp 25 reaches a recording drum 27 carrying the paper sensitive to light, through a collecting lens 26. The dilatation of the test piece 1 is thus plotted on the recording drum. Coil 13, which is surrounded by the magnets 14 with an air gap, is suspended on the other end of a balance beam 23. The current induced in coil 13 serves to record the change of the rate of dilatation on drum 27, with the aid of a reflecting galvanometer 28 and the light of a lamp 29. The change of the temperature of the test piece 1 is similarly plotted with the aid of a reflecting galvanometer 30, and the change of the heat content of the test piece by means of a reflecting galvanometer 31, the latter procedure being known in itself.

In the apparatus according to FIG. 2, the thermobalance of the derivatograph is not used for weighing but for measuring dilatation and its rate. When the nature of the examination requires weighing, in addition to dilatation measurements, there may be used, for example, the apparatus according to FIGS. 4 and 5. Here, the quartz tube 20 surrounding the thermocouple 5 of the test piece 1 is enclosed in another quartz tube 32 having a funnel-like upper part forming a stirrup 33 and rests on the upper surface of the test piece 1. The weight of the quartz body 32, 33 loads this surface.

With further regard to FIGS. 4 and 5, the test piece 1 loads one end of the balance beam 23, with the mediation of the tube 20. The balance determines the change of weight of the test piece. The derivation apparatus suspended on the other extremity of the balance beam measures in a known manner the rate of change of weight. The change in the heat content and the temperature of the test piece are determined in a manner known per se by means of the galvanometers 30 and 31 connected into the circuit of the oppositely connected thermocouples 5 and 6. Diaphragms 34 and 35 are fixed to the tubes 20, 32. If the test piece 1 dilates or contracts, the tubes 20, 32 together with the diaphragms 34, 35 are displaced in relation to one another, so that the parallel light beams of a lamp reach a thermoelement 36 provided behind the diaphragms through the slot arranged on the diaphragms, to an extent corresponding to the degree of displacement. Thereupon a current with a voltage corresponding to the extent of dilatation is induced in the thermoelement. The thermoelement is connected with a reflecting galvanometer 37 whereby continuous recording of the change of dilatation is possible. The photoelectrically produced current is derived by means of a transformer, in accordance with an earlier invention of the inventors. If the current of the thermoelement is led into the primary coil of a transformer 38, the derivative of the primary current occurs in the secondary coil. This current can be determined by means of a reflecting galvanometer 39. When this current is plotted on the drum 27, there is obtained the derivative of the dilation curve, i.e. the curve representing the change of the rate of dilatation.

Any known sensing, derivation, measuring or recording apparatus may be employed in great variety within the scope of the invention, in conformity with the requirements.

In the case of the apparatus represented in FIGS. 4 and 5 which is suited for recording six different parameters, it is, for example, possible to use instead of the diaphragms 34 and 35 and the thermoelement or photocell or phototransistor 36 any other electrical element known per se for producing an electrical signal which is proportional to the dilatation. Said electrical element may consist for example of two armatures of a condenser fixed on quartz tubes 20 and 32, or of a condenser fixed on the quartz tube 20, and a plate fixed on the quartz tube 32 and sliding between the two armatures of the condenser, made of a material with high dielectric constant, or of a double coil fixed to the tube 20 and an iron core moving in the interior of the coils together with the tube 32.

Having described our invention, we claim:

Thermal testing and analysis apparatus for simultaneously measuring and recording the temperature (TA), weight (TGA), thermal expansion (TDA), and rate of change of weight and thermal expansion of a test specimen and the differential temperature (DTA) between said test specimen and a reference specimen, said reference specimen being inert through the tested temperature range, said apparatus comprising a balance movable under the weight of a test specimen whereby the balance position is a measure of the weight, and the balance velocity is a measure of the rate of change of the weight, of said test specimen;

a first supporting means for supporting said test specimen on said balance, said first supporting means comprising two separate members movable with said balance and adapted to contact spaced portions of said test specimen, said members being slidably movable relative to each other whereby their relative position is a measure of the thermal expansion, and their relative velocity is a measure of the rate of change of thermal expansion, of said test specimen;

a second supporting means for supporting said reference specimen in close proximity with said test specimen, said second supporting means being mechanically independent of said balance;

means for simultaneously and equally heating both the test specimen and the reference specimen;

means for sensing and recording the temperature of said test specimen as a first trace on a record;

means for sensing and recording the differential temperature between said test specimen and said reference specimen as a second trace on said record coextensive with said first trace;

means for sensing and recording the balance position as a measure of the weight of said test specimen as a third trace on said record coextensive with said first and second traces;

means for sensing and recording the balance velocity as a measure of the rate of change of the weight of the test specimen as a fourth trace on said record coextensive with said first, second and third traces;

means for sensing and recording the relative position of said separate members as a measure of the thermal expansion of said test specimen as a fifth trace on said record coextensive with said first, second, third, and fourth traces; and means for sensing and recording the relative velocity of said separate members as a measure of the rate of change of the thermal expansion of said test specimen as a sixth trace on said record coextensive with said first, second, third, fourth, and fifth traces.

No references cited.

RICHARD C. QUIESSER, *Primary Examiner.*